(12) United States Patent
Robinson

(10) Patent No.: US 6,730,353 B2
(45) Date of Patent: May 4, 2004

(54) COATING FOR DRINKING WATER PIPELINES

(75) Inventor: Ian Robinson, Thirsk (GB)

(73) Assignee: E. Wood Limited, Wetherby (GB)

( * ) Notice: Subject to any disclaimer, the term of this patent is extended or adjusted under 35 U.S.C. 154(b) by 0 days.

(21) Appl. No.: 09/781,596

(22) Filed: Feb. 12, 2001

(65) Prior Publication Data

US 2002/0045006 A1 Apr. 18, 2002

(51) Int. Cl.$^7$ .................................................. B05D 7/22
(52) U.S. Cl. ...................... 427/236; 427/230; 427/239; 427/421; 427/422; 427/426
(58) Field of Search ................................ 427/230, 236, 427/239, 421, 426, 422

(56) References Cited

U.S. PATENT DOCUMENTS

| | | |
|---|---|---|
| 3,689,311 A | 9/1972 | Loeffler et al. |
| 3,973,056 A | 8/1976 | Fessler et al. |
| 4,115,614 A | 9/1978 | Martin, Jr. |
| 4,126,718 A | 11/1978 | Christie et al. |
| 4,209,555 A | 6/1980 | Stewart |
| 4,267,081 A | 5/1981 | Seneker |
| 4,496,707 A | 1/1985 | Liggett |
| 4,540,750 A | 9/1985 | Ham |
| 4,543,366 A | 9/1985 | Smith |
| 4,554,300 A | 11/1985 | Liggett et al. |
| 4,632,959 A | 12/1986 | Nagano |
| 4,695,605 A | 9/1987 | Goel |
| 4,748,201 A | 5/1988 | Smith |
| 5,081,168 A | 1/1992 | Edwards et al. |
| 5,098,780 A | 3/1992 | Nemunaitis et al. |
| 5,106,943 A | 4/1992 | Yoshimatsu |
| 5,130,402 A | 7/1992 | Akiyama et al. |
| 5,178,902 A | 1/1993 | Wong et al. |
| 5,232,996 A | 8/1993 | Shah et al. |
| 5,256,226 A | 10/1993 | Marzola et al. |
| 5,525,676 A | 6/1996 | Kitayama et al. |
| 5,561,208 A | 10/1996 | Takahashi et al. |
| 5,573,040 A | 11/1996 | Schumacher et al. |
| 5,621,043 A | 4/1997 | Croft |
| 5,707,702 A | 1/1998 | Brady, Jr. et al. |
| 5,792,518 A | 8/1998 | Gibson et al. |
| 5,811,489 A | 9/1998 | Shirai et al. |
| 6,074,702 A * | 6/2000 | Robinson ..................... 427/236 |
| 6,399,736 B1 * | 6/2002 | Primeaux et al. ............. 528/84 |

FOREIGN PATENT DOCUMENTS

| | | |
|---|---|---|
| EP | 0 431 728 A1 * | 6/1991 |
| EP | 0759550 | 2/1997 |
| EP | 0936235 | 8/1999 |
| GB | 1139115 | 1/1969 |
| GB | 2165772 | 4/1986 |
| GB | 2307192 | 5/1997 |
| JP | 58 049771 | 3/1983 |
| JP | 59 062620 | 4/1984 |
| JP | 03275781 | 12/1991 |
| JP | 05 043833 | 2/1993 |

* cited by examiner

*Primary Examiner*—Shrive P. Beck
*Assistant Examiner*—Kirsten Crockford Jolley
(74) *Attorney, Agent, or Firm*—David E. Rogers; Squire, Sanders & Dempsey L.L.P.

(57) ABSTRACT

A two-part coating system comprises a first part comprising one or more aliphatic polyisocyanates, optionally blended with one or more "amine reactive" resins and/or non reactive resins, and a second part comprising one or more aromatic polyamines optionally blended with one or more oligomeric polyamines, such that the two parts, when mixed together and applied to the internal surfaces of pipelines, form a rapid setting impervious coating suitable for contact with drinking water.

11 Claims, No Drawings

COATING FOR DRINKING WATER PIPELINES

This invention relates to two-part, rapid setting coating systems useful as internal linings for pipelines carrying drinking water.

The use of two-part coating systems, in particular those based on liquid epoxide resins and polyamine curing agents, to form protective linings for drinking water pipelines is well known. Such two-part systems have a demonstrable track record for both the "in-situ" refurbishment of existing water mains and for the protection of new pipelines. They provide thin, smooth linings with excellent carrying capacity and long term durability. However, these systems exhibit one main limitation for "in-situ" use in that due to their relatively slow hardening characteristics it is necessary to allow the coatings to harden minimally for 16 hours before returning the pipeline to service.

European Patent Application EP-A-0936235 discloses the use of aliphatic polyisocyanates blended with liquid epoxide resin or non-reactive resin, in combination with selected aromatic diamines, to provide rapid setting coating compositions useful as internal linings for pipelines, in particular as "in-situ" applied linings for refurbishment of drinking water pipelines. Such compositions, by virtue of their rapid setting characteristics, allow return to service in 2 hours or less with no adverse effects on water quality.

EP-A-0936235 teaches the use of a liquid epoxide resin or non-reactive resin in order to extend the gel time, reduce the heat of reaction and reduce the shrinkage of the pure polyurea systems obtained from the combination of aliphatic polyisocyanate(s) with aromatic polyamine(s).

The present invention provides a two-part coating system that can be applied to internal pipeline surfaces so as to form, at a high cure rate, an impervious lining suitable for contact with drinking water. By virtue of its rapid setting characteristics and insensitivity to moisture, the system of the present invention is particularly useful as an "in-situ" applied lining for refurbishment of existing drinking water pipelines.

The first part of a two-part coating system according to the present invention comprises one or more aliphatic polyisocyanates, optionally blended with one or more "amine reactive" resins and/or non-reactive resins.

The aliphatic polyisocyanate(s) employed in the invention can be any organic isocyanate compound containing at least two isocyanate functional groups, said isocyanate groups being aliphatic in nature. Suitable polyisocyanates include hexamethylene-1,6-diisocyanate; 2,2,4trimethylhexamethylene diisocyanate; isophorone diisocyanate; 4,4'-dicyclohexylmethane diisocyanate. Alternatively, reaction products or prepolymers derived from the above may be utilized. For the purposes of the present invention, the preferred polyisocyanates are derivatives of hexamethylene-1,6-diisocyanate. The polyisocyanate compounds have a preferred isocyanate content of between 5 and 50%, with 20–25% being particularly preferred.

The "amine reactive" resin(s) can be any compound containing functional groups which are capable of reacting with primary or secondary amines. Useful materials include epoxy functional compounds and any compounds containing unsaturated carbon-carbon bonds capable of undergoing "Michael Addition" with polyamines, e.g. monomeric or oligomeric polyacrylates. For the purposes of the present invention, liquid epoxide resins or oligomeric polyacrylates are preferred.

Non-reactive resins, whilst not currently preferred in the present invention, may be employed provided that they have no resulting adverse effects on water quality.

The second part of a two-part system according to the present invention comprises one or more polyamines.

Preferably, the second part of the system comprises one or more aromatic polyamines, optionally blended with one or more oligomeric polyamines.

The aromatic polyamine employed can be any organic compound containing at least two primary or secondary amine groups, wherein said amine groups are substituted directly to an aromatic moiety. Suitable aromatic polyamines include diethyl toluenediamine; dimethylthio toluenediamine; 4,4'-methylenebis (2-isopropyl-6-methylaniline); 4,4-methylenebis (2,6-diisopropylaniline); 4,4-methylenebis (2,6-dimethylaniline); 4,4-methylenebis (2,6-diethylaniline); 4,4-methylenebis (2-ethyl-6-methylaniline); 4,4-methylenebis (3-chloro-2,6-diethylaniline). For the purposes of the present invention, diethyl toluenediamine is particularly preferred.

The oligomeric polyamine can be any higher molecular weight organic compound containing at least two primary or secondary amine groups, said amine groups being either aliphatic, cycloaliphatic or aromatic in nature. Suitable compounds include poly (oxypropylene) diamines, poly (oxypropylene) triamines, poly (oxytetramethylene)-di-p-aminobenzoates. For the purposes of the present invention, the preferred compounds are poly (oxypropylene) diamines and poly (oxytetramethylene) di-p-aminobenzoates. The preferred oligomeric polyamines have a molecular weight in the range 400–6000, with molecular weights of 500–3000 particularly preferred. Whilst not currently preferred in the present invention, a second part composed solely of oligomeric polyamines or non-aromatic polyamines may be employed provided that there are no resulting adverse effects on water quality.

Various two-part systems embodying the invention are described below, by way of non-limiting example.

EXAMPLES

Table 1 below shows the results obtained when the liquid epoxide resin (Diglycidyl ether of Bisphenol A, "BADGE") in the preferred formulation(s) set out in European Patent Application EP-A-0936235 was replaced by alternative amine reactive resins, viz. monomeric or oligomeric polyacrylates.

TABLE 1

| Amine Reactive Resin | Addition Level (Parts per 100 of polyiso-cyanate) | Film Set Time (Mins) 1 mm Film @ 3° C. | Linear Shrinkage (%) | Film Integrity in Presence of Water |
|---|---|---|---|---|
| BADGE | 0 | 2.5 | 0.150 | Excellent |
|  | 20 | 4 | 0.090 | Excellent |
|  | 40 | 5 | 0.040 | Excellent |
| Trimethylol- | 0 | 2.5 | 0.150 | Excellent |
| propane | 20 | 3.5 | 0.100 | Excellent |
| triacrylate | 40 | 4.5 | 0.050 | Excellent |
| Penta- | 0 | 2.5 | 0.100 | Excellent |
| erythritol |  |  |  |  |
| triacrylate | 20 | 4 | 0.085 | Excellent |
|  | 40 | 5 | 0.035 | Excellent |
| Dipenta- | 0 | 2.5 | 0.150 | Excellent |
| erythritol | 20 | 4 | 0.090 | Excellent |
| pentaacrylate | 40 | 5 | 0.040 | Excellent |

It can be seen from these results that other, "amine reactive" resins e.g. monomeric or oligomeric polyacrylates can usefully reduce the shrinkage of aliphatic polyisocyanate—aromatic polyamine systems, whilst still retaining rapid setting capability at low temperatures under adverse (wet) conditions.

Table 2 below shows the results obtained when the basic aliphatic polyisocyanate-aromatic polyamine system was modified by blending oligomeric polyamines with the aromatic polyamine.

TABLE 2

| Aromatic polyamine/ oligomeric polyamine ratio w/w | Oligomeric polyamine | Film Set Time (Mins) 1 mm Film @ 3° C. | Linear Shrinkage (%) | Film Integrity in Presence of Water |
|---|---|---|---|---|
|  | Poly(oxypropylene) diamine | 3.5 Mins | 0.030 | Excellent |
| 50/50 | Poly(oxytetramethylene)-Di-p-amino-benzoate | 4.5 Mins | 0.027 | Excellent |
|  | 50/50 Blend (w/w) of the above | 4 Mins | 0.028 | Excellent |
|  | Poly(oxypropylene) diamine | 4 Mins | 0.028 | Excellent |
| 40/60 | Poly(oxytetramethylene)-Di-p-amino-benzoate | 5 Mins | 0.025 | Excellent |
|  | 50/50 Blend (w/w) of the above | 4.5 Mins | 0.026 | Excellent |
|  | Poly(oxypropylene) diamine | Gelled instantly | N/A | N/A |
| 0/100 | Poly(oxytetramethylene)-Di-p-amino benzoate | 8 Hours | 0.005 | Excellent |
|  | 50/50 Blend (w/w) of the above | 5 Mins | 0.016 | Excellent |

It can be seen from comparison of these results against those illustrated in Table 1 that the incorporation of oligomeric diamines usefully reduces the shrinkage of the basic aliphatic polyisocyanate-aromatic polyamine system, whilst again retaining the rapid film set and insensitivity towards moisture.

Table 3 below shows the results obtained from combining the work illustrated in Tables 1 and 2. In the examples shown, the oligomeric polyamine was a 50/50 (w/w) blend of poly(oxypropylene) diamine and poly(oxytetramethylene)di-p-aminobenzoate.

TABLE 3

| Aromatic Polyamine/ Oligomeric Polyamine Ratio w/w | Amine Reactive Resin | Addition level (Parts per 100 of polyisocyanate) | Film Set Time (Mins) 1 mm Film c@ 3° C. | Linear Shrinkage (%) |
|---|---|---|---|---|
|  | BADGE | 20 | 4.5 | 0.025 |
|  |  | 40 | 5 | 0.023 |
| 50/50 | Dipentaerythritol pentaacrylate | 20 | 4.5 | 0.024 |
|  |  | 40 | 5 | 0.022 |
|  | BADGE | 20 | 5 | 0.023 |
|  |  | 40 | 5.5 | 0.022 |
| 40/60 | Dipentaerythritol pentaacrylate | 20 | 5 | 0.022 |
|  |  | 40 | 5.5 | 0.020 |

In all cases, the film integrity under wet conditions was excellent.

It can be seen from these results that inclusion of the "amine reactive" resin can yield further reductions in shrinkage without significantly impacting on the film set time at low temperature.

Table 4 below shows the results obtained when a number of compositions representative of some of the preferred forms of the invention were evaluated for suitability for contact with drinking water in accordance with the requirement of BS 6920:2000. In all cases the coating compositions were applied at a nominal film thickness of 1 mm and allowed to cure for 30 minutes at 3° C. prior to commencement of testing. In examples illustrated, the oligomeric polyamine "blend" was a 50/50 (w/w) blend of poly(oxypropylene) diamine and poly(oxytetramethylene)-di-p-aminobenzoate, with the "amine reactive" resin employed at an addition level of 25 parts per 100 of polyisocyanate (w/w).

TABLE 4

| System | Oligomeric Polyamine | Aromatic Polyamine/ Oligomeric Polyamine Ratio w/w | Amine Reactive Resin | BS6920:2000 Test Result |
|---|---|---|---|---|
| A |  | 100/0 | Dipentaerythritol pentaacrylate | PASS |
| B | Poly(oxypropylene) diamine | 50/50 |  | PASS |
| C | Poly(oxytetramethylene)-Di-p-amino-benzoate | 50/50 |  | PASS |
| D | Blend | 50/50 |  | PASS |
| E | Blend | 50/50 | BADGE | PASS |
| F | Blend | 50/50 | Dipentaerythritol pentaacrylate | PASS |

These results show that the invention allows quite wide formulatory latitude in designing coating systems which will set rapidly under adverse conditions (for example when applied underground, in-situ to an existing drinking water pipeline) without having any deleterious effects on water quality.

Table 5 below illustrates some of the differences in physical and mechanical properties of the compositions detailed in Table 4. All the compositions were cured for 24 hours prior to testing. Flexural properties were determined in accordance with BS EN ISO 178:1997 and tensile properties in accordance with BS EN ISO 527:1996.

TABLE 5

| System | Flexural Strength (MPa) | Tensile Strength (MPa) | Elongation @ Break (%) |
|---|---|---|---|
| A | 55.2 | 28.4 | 2 |
| B | 43.0 | 29.5 | 40 |
| C | 52.0 | 33.0 | 10 |
| D | 44.8 | 28.0 | 30 |
| E | 43.5 | 27.2 | 35 |
| F | 44.0 | 27.7 | 35 |

These results illustrate that variations in composition, within the scope of the invention, allow the design of coating systems to meet specific design criteria whilst still satisfying the key requirements for in-situ application to drinking water pipelines.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

I claim:

1. A method of forming a coating on the internal surface of a drinking water pipeline, the method comprising the steps of:
   (a) providing a first part comprising one or more aliphatic polyisocyanate,
   (b) providing a second part comprising one or more aromatic polyamines and one or more oligomeric polyamines blended together,
   (c) mixing together the first part and second part to form a mixture,
   (d) applying the mixture as a coating to the internal surface of a drinking water pipeline; and
   (e) allowing the coating to cure by reaction of the one or more aromatic polyamines and the one or more oligomeric polyamines with the one or more polyisocyanate, the coating suitable for contact with drinking water.

2. The method according to claim 1 wherein the polyisocyanate is selected from the group consisting of hexamethylene-1,6-diisocyanate; 2,2,4-trimethylhexamethylene diisocyanate; isophorone diisocyanate; and 4,4'-dicyclohexylmethane diisocyanate.

3. The method according to claim 1 wherein the aromatic polyamine is selected from the group consisting of diethyl toluenediamine; dimethylthio toluenediamine; 4,4'methylenebis (2-isopropyl-6-methylaniline); 4,4'-methylenebis (2,6-diisopropylaniline); 4,4'methylenebis (2,6-dimethylaniline); 4,4'methylenebis (2,6-diethylaniline); 4,41-methylenebis (2-ethyl-6-methylaniline); and 4,4'methylenebis (3-chloro-2,6-diethylaniline).

4. The method according to claim 1 wherein the oligomeric polyamine contains at least two primary or secondary amine groups, the amine groups being either aliphatic, cycloaliphatic or aromatic in nature.

5. The method according to claim 4 wherein the oligomeric polyamine is selected from the group consisting of poly (oxypropylene) diamines, poly (oxypropylene) triamines, and poly (oxytetramethylene)-di-p-aminobenzoates.

6. The method according to claim 5 wherein the oligomeric polyamines has a molecular weight in the range 400–6000.

7. The method according to claim 6 wherein the oligomeric polyamines has a molecular weight in the range 500–3000.

8. The method according to claim 1 wherein said first part includes one or more amine reactive resins blended with the one or more polyisocyanates.

9. The method according to claim 8 wherein said amine reactive resin is diglycidyl ether of bisphenol A or Dipentaerythritol pentaacrylate.

10. The method according claim 1 wherein the mixture is applied through heated airless spray equipment.

11. The method according to claim 10 wherein said spray equipment includes a centrifugal spinning head or self-mixing spray gun assembly.

* * * * *